Figure 1:
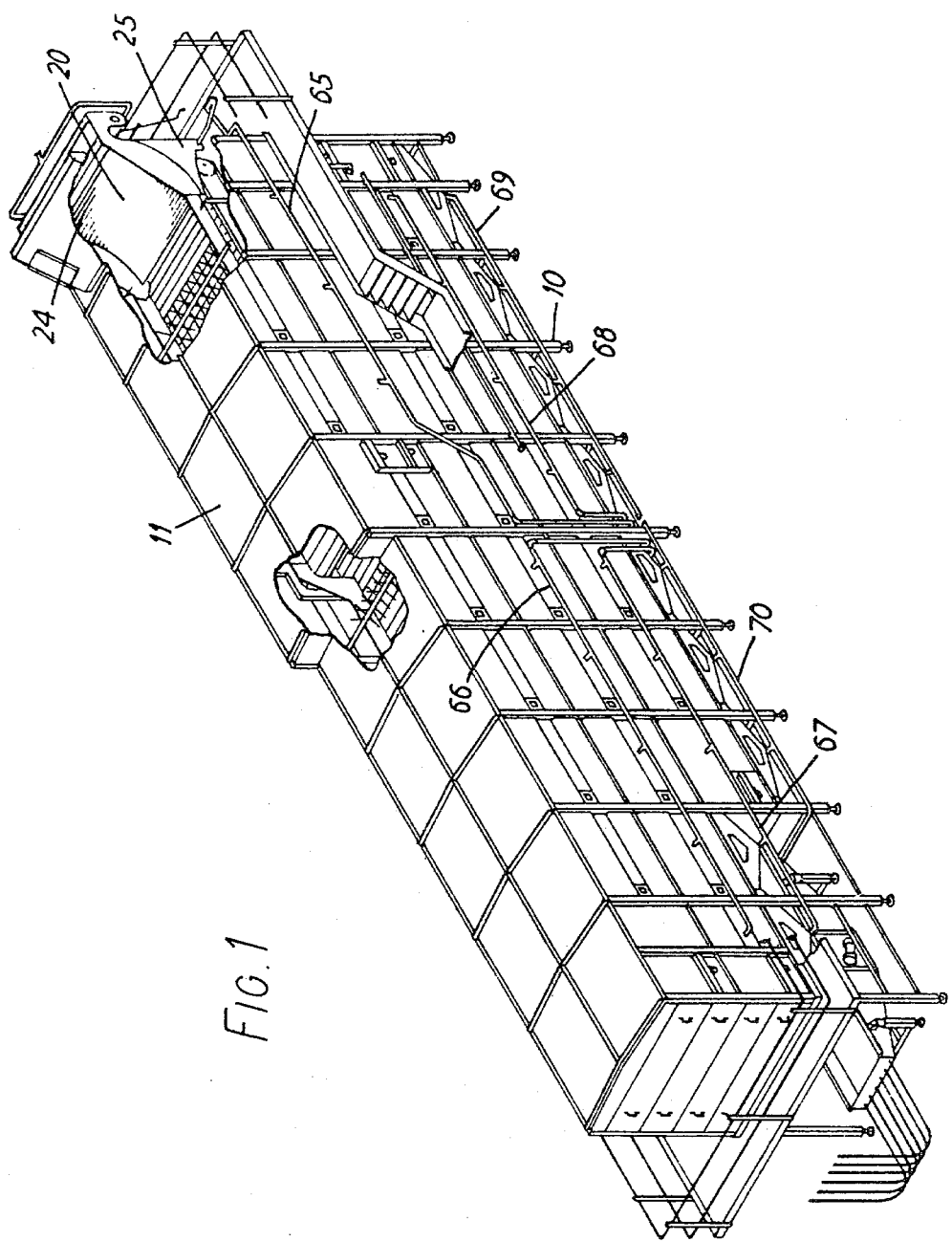

United States Patent [19]
Brockwell

[11] 4,309,941
[45] Jan. 12, 1982

[54] CHEESE MAKING METHOD AND APPARATUS
[75] Inventor: Ian P. Brockwell, Wyckoff, N.J.
[73] Assignee: Alfa Laval AB, Tumba, Sweden
[21] Appl. No.: 131,927
[22] Filed: Mar. 21, 1980
[30] Foreign Application Priority Data
  Mar. 23, 1979 [GB] United Kingdom ............... 10317/79
[51] Int. Cl.³ ............................................. A01J 25/11
[52] U.S. Cl. ........................................ 99/453; 99/459; 99/465; 99/466; 426/491; 426/495; 426/582
[58] Field of Search .................. 99/452, 453, 456–459, 99/467, 460, 464–466; 426/490, 491, 495, 582, 583

[56] References Cited
U.S. PATENT DOCUMENTS

| 3,518,094 | 6/1970 | Nikolic | 99/456 |
| 3,592,124 | 11/1968 | Pontecorvo et al. | 99/453 |
| 3,636,630 | 1/1972 | Budahn | 99/456 |
| 3,695,893 | 10/1972 | Czulak et al. | 99/458 |
| 4,217,818 | 8/1980 | Hazen | 99/456 |

Primary Examiner—Philip R. Coe
Assistant Examiner—Timothy F. Simone
Attorney, Agent, or Firm—Curtis, Morris & Safford

[57] ABSTRACT

A cheesemaking installation comprising means for forming a mat of curd from a slurry of curd and whey, a plurality of endless conveyors for continuously moving the mat of curd in succession through a drying and de-wheying section, a fusing section, a stretching and cheddaring section, a milling section having means for cutting the curd into separate particles or pieces, a salting section having means for applying salt to the curd, and a mellowing section permitting absorption of the salt into the curd, and means for agitating the curd in the de-wheying and salting sections. Additional agitators are selectively operable when the installation is used for production of granular curd, and water sprays are provided for use when producing washed granular curd. The installation is completely enclosed to enable the temperature to be controlled and prevent air-borne contamination.

19 Claims, 6 Drawing Figures

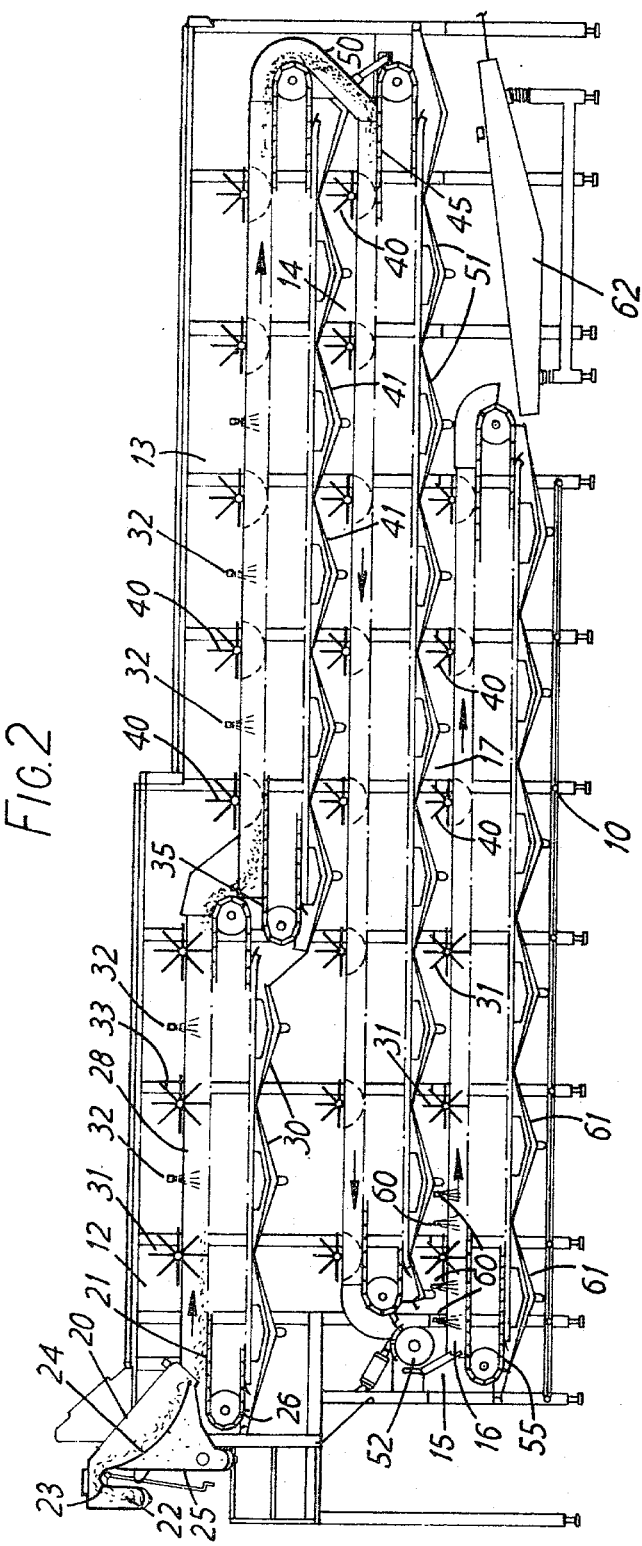

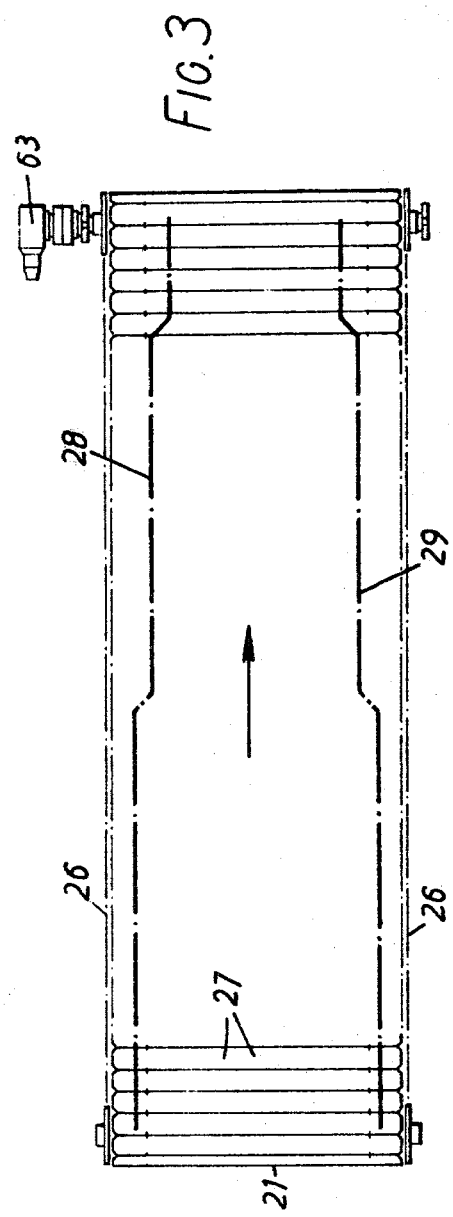
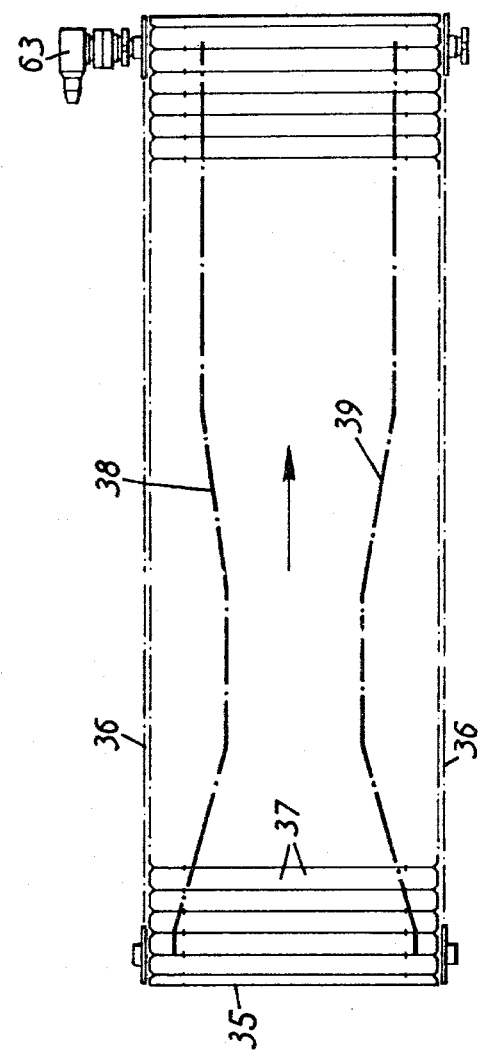

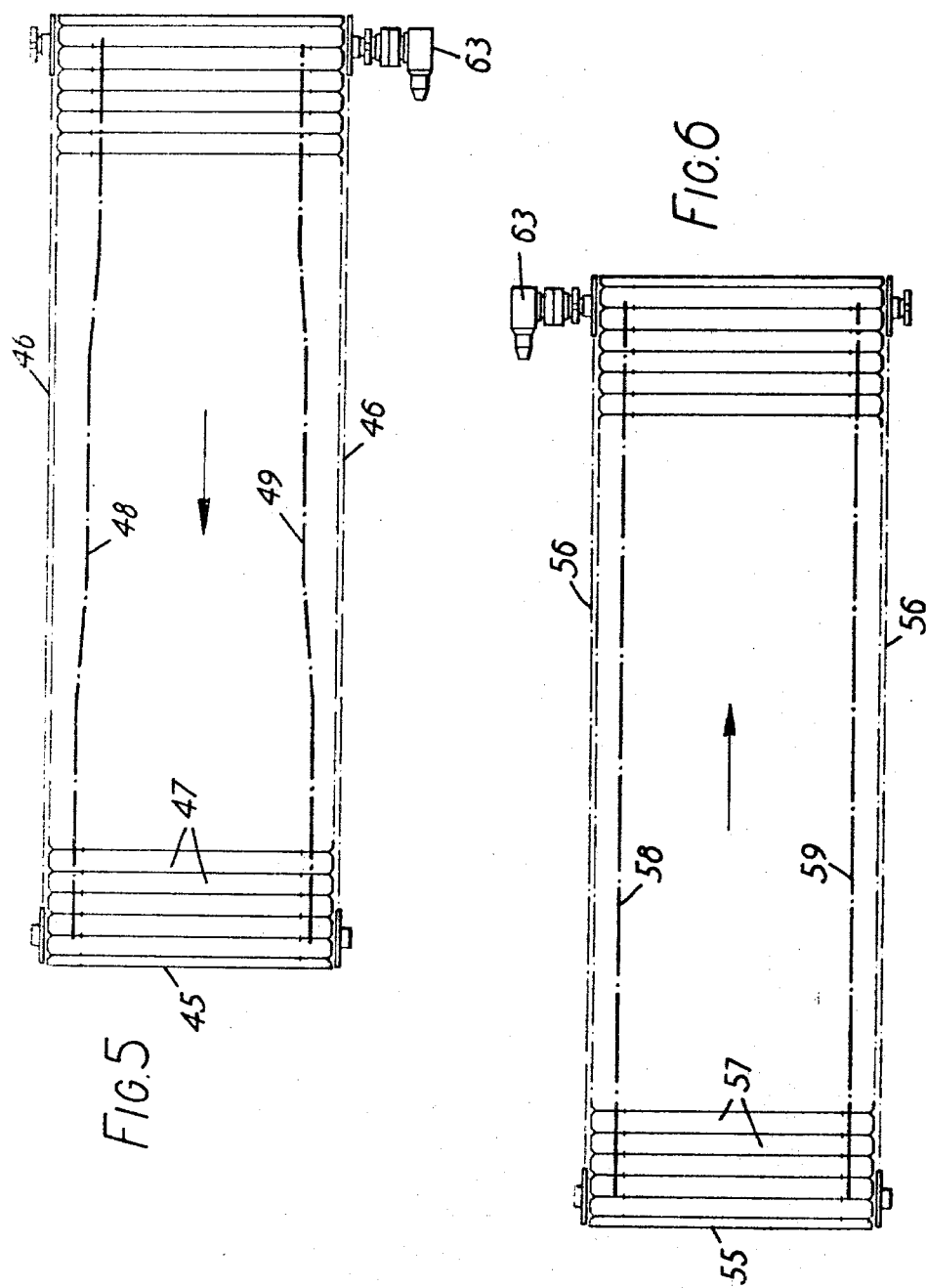

CHEESE MAKING METHOD AND APPARATUS

The present invention relates to improvements in cheese making methods and apparatus and is particularly (but not exclusively) applicable to the production of cheddar cheese.

Conventionally cheese making has involved a number of different steps or stages which have normally been carried out in different apparatus and transported either manually or with some mechanised aid between the apparatus stages. The various stage include producing a slurry of cheese curd and whey from a milk supply; draining most of the whey from the curd; fusing or matting the drained curd together and allowing a period of time for acid development in the so-called cheddaring stage; milling or cutting the matted curd into small particles and applying salt to these particles or chips; allowing a further period of time for mellowing of the salted curd particles; and subsequently pressing the salted curd particles into a coherent mass before packing into blocks. The quality of cheese produced by these techniques has to a very large extent depended upon the skill and experience of the cheese maker in controlling the various operating parameters and in particular in determining appropriate draining, acid development and mellowing times.

Over recent years there have been several attempts (particularly in cheddar cheese making) to mechanise the process by providing continuous or semi-continuous installations. These developments have generally involved trying to get a continuous flow through all or part of the various stages of production and have normally used different types of conveyors for conveying the curd through and between the various stages. These systems, although providing some advantages from the point of view of improving the flow rate of material through the system, have not proved altogether satisfactory in practice. Some of the disadvantages of these known systems are listed below.

(I) They do not provide a continuous through flow of material through all stages of the cheese making process within one machine, and in particular, a continuous through flow from the cheddaring stage through a milling operation and the subsequent salting and mellowing stages.

(II) They provide insufficient control of the variable parameters involved in cheese making and in consequence the quality of cheese produced suffers. Generally it is desirable to be able to vary the maturing or cheddaring time as well as the mellowing time in response to the acidity level of the cheese at varying times throughout its development. Generally known mechanised systems do not allow for easy testing of the acidity levels at the various critical phases of production.

(III) One of the major problems with both conventional and the more recent mechanised or semi-mechanised systems is the high capital expense of the installation. However, generally very little attempt has been made to restrict the floor space required for these installations and the high capital expense of the machinery is aggravated by the high capital cost of the floor space required for the installation.

(IV) Known mechanised and semi-mechanised systems have generally suffered from an inflexibility in that they are usually only capable of producing one type of cheese.

One of the main objectives of the present invention is to provide an apparatus for cheese production, capable of continuous through flow from the production of cheese curd and whey to subsequent salting and mellowing stage.

According to the present invention there is provided a cheese making apparatus comprising whey draining means for receiving a slurry of curds and whey and for draining a substantial portion of the whey therefrom, an endless conveyor system for receiving drained curd from said whey draining means and for moving the curd in succession through a drying and de-wheying section, a fusing section for forming the curd onto a mat, and a cheddaring section for acid development in the curd, means for cutting the cheddared curd into separate particles or pieces, and an endless salting conveyor disposed substantially beneath the aforementioned conveyor system for receiving pieces or particles of curd from said cutting means, the salting conveyor being arranged to pass the pieces of curd through a salting section having means for applying salt to the curd and a mellowing section permitting absorption of the salt into the curd.

The apparatus of the invention is preferably provided with a plurality of trays for collecting whey drained from the curd, the trays being arranged so as to segregate whey of different acid levels drained from the different sections of the apparatus. The conveyor system preferably comprises a plurality of conveyors each provided with separate drive means which are individually adjustable to vary the speed of each conveyor, whereby the acidity level of the whey drained from each of said sections may be adjusted by varying the residence time of the curd in each of the sections.

The apparatus can then be completely enclosed in a casing to enable the temperature of the curd to be maintained at a substantially constant temperature and to avoid air-borne contamination, the speed of the conveyors and other parameters which affect the quality of the cheese being controlled in accordance with the measured acidity levels of the whey drained from the various sections.

A cheese making apparatus according to the invention for producing cheddar cheese, but which is also capable of being used for producing other forms of cheese, will now be described by way of example, with reference to the accompanying drawings, in which:

FIG. 1 is a perspective view of the installation, with part of the outer casing cut away to show details of construction.

FIG. 2 is a cross sectional elevation view of the apparatus taken from the other side to that shown in FIG. 1, FIG. 3 is a plan view of the conveyor in the whey drainage section of the apparatus showing in broken lines the side skirts for retaining the curd on the conveyor, FIG. 4 is a plan view of the conveyor in the matting and fusing section, showing the side skirts in broken lines, FIG. 5 is a plan view of the conveyor in the cheddaring section, showing the side skirts in broken lines, and FIg. 6 is a plan view of the conveyor in the salting and mellowing sections, showing the side skirts in broken lines.

The cheese making apparatus shown in the drawings comprises a frame 10 fitted with an outer casing 11 which completely encloses a primary whey drainage section 12, a matting and fusing section 13, a cheddaring section 14, a milling section 15, a salting section 16 and a mellowing section 17. The whey drainage section 12 and the matting and fusing section 13 are positioned above the cheddaring section 14 which is in turn positioned above the salting section 16 and mellowing section 17, so that the cheese curd flows in a cascade flow pattern from an upper input level to a lower output level.

The primary drainage section 12 has a drainage unit 20 and a drainage conveyor 21. The unit 20 consists of a reservoir 22 for reception of a slurry of curds and whey, the reservoir having a weir 23, a drainage screen 24 inclined downwardly from the weir for reception of slurry overflowing the weir, and a tray 25 for collecting whey drained from curd flowing down the screen. The curds travel by gravity downwardly over the screen while a substantial portion of the whey is drained through the screen and collected in the tray 25. The screen 24 comprises a plurality of closely spaced parallel bars of wedged shaped cross section which define drainage apertures having opposing walls which are flared outwardly from one another in the direction from the upper surface to the lower surface of the screen. The drainage screen is curved so that the end of the screen adjacent the weir lies at a steep angle to the horizontal and the end of the screen remote from the weir lies at a shallow angle of inclination to the horizontal. The reservoir, screen and tray form a single unit mounted for pivotal movement about a substantialy horizontal axis so as to adjust the angle of inclination of the screen to the horizontal. The curd exits from the drainage screen 24 onto the drainage conveyor 21. The drainage unit 20 is the subject of our co-pending patent application No.

The drainage conveyor 21 comprises an endless slat conveyor (FIG. 3) consisting of two endless drive chains 26, a plurality of thin metal slats 27 extending between and mounted on the chains, and two side skirts 28, 29 for retaining the curd on the slats, the side skirts being fixed to the frame and in sliding contact with the slats. The slats are provided with perforations for draining whey from curd on the conveyor, and a plurality of trays 30 are positioned below the conveyor to collect whey draining therefrom. Arranged above the conveyor 21 are a number of peg stirrers 31 and spray nozzles 32 between the peg stirrers 31. The stirrers 31 each comprises a shaft extending transversely across the conveyor and rotatably mounted in bearings on the frame 10, the shaft having radially extending pegs or arms 33 spaced at equal angular intervals around the shaft and arranged to engage curd on the conveyor upon rotation of the shaft. The shaft is driven by a motor (not shown). The pegs 33 may be helically arranged along the shaft.

The matting and fusing section 13 has a conveyor 35 consisting of two endless chains 36, transverse slats 37 mounted on and extending between the chains, and side skirts 38, 39 for retaining curd on the slats. The upper run of conveyor 35 is provided with peg stirrers 40 similar to peg stirrers 31 except that the pegs extend radially on only about half the periphery of the drive shaft whereby the stirrers may be parked in a non-operative position out of contact with any material on the conveyor. The conveyor 35 extends from and slightly beneath the conveyor 21, the direction of movement of the upper runs of the conveyors 21, 35 being the same such that cheese curd (at this stage being in loose particle form) passes directly from the conveyor 21 to the conveyor 35. The length and speed of the conveyor 35 is sufficient to allow the initially particulate cheese curd to pile and fuse and mat together, when the peg stirrers 40 are in the parked non-operative position, such that at the end of conveyor 35 a substantially continuous mat of cheese curd is formed. A plurality of trays 41 are positioned below the conveyor 35 to collect whey from the curd on the conveyor, the whey draining through the gaps between the slats of the conveyor.

The cheddaring section 14 comprises a conveyor 45 (FIG. 5) consisting of two endless chains 46, transverse slats 47 on the chains, and side skirts 48, 49 for retaining curd on the slats. A plurality of peg stirrers 40 having pegs on only one half of the periphery of the stirrer are spaced along the conveyor, the stirrers being positioned between the drainage trays 41 of conveyor 35 to minimise the overall height of the installation. The cheddaring conveyor 45 is arranged with its direction of movement opposite to that of the conveyor 35. A deflector plate 50 is mounted on the frame at the end of conveyor 35 and arranged to invert the mat of curd and guide it onto the upstream end of conveyor 45. A plurality of trays 51 are positioned below the conveyor 45 to collect whey from the curd on the conveyor, the whey draining through the gaps between the slats of the conveyor.

The milling section 15 is at the downstream end of the cheddaring conveyor 45. The milling section comprises a cutting device 52 adapted to cut the mat of cheese curd into small particles or chips ready for salting. Salt is generally absorbed more quickly when the surface area to volume of the cheese curd is relatively large and this ratio is increased by decreasing the size particle or chip. The cutting device 52 comprises a cylindrical drum having a transverse plate adapted to cut a strip across the complete width of the cheese curd mat and shorter longitudinal blades generally perpendicular to the transverse blade adapted to cut the transverse strips into shorter "chip" lengths. Drive means are operable to oscillate the drum between a cutting position and an inoperative position generally beneath the curd mat. In the cutting position the blades strike the curd mat against a cutting block arranged above the mat. The length of travel of the oscillating blades need only be fairly short such that movement of the blade occurs generally within the lower left-hand quadrant as viewed in FIG. 2. The cheese curd cut in any one stroke of the cutting blade is generally dislodged by curd cut in a subsequent stroke such that the curd chips fall by gravity into the salting section 16. The cutting device 52 is of known construction and has not been illustrated in detail.

The salting section 16 has the upstream half of a conveyor 55 which is positioned below the cheddaring conveyor 45 and adapted to move in a direction opposite to that of conveyor 45. The conveyor 55 (FIG. 6) consists of two endless chains 56, transverse slats 57 on the chains, and side skirts 58, 59 for retaining curd on the slats. The salting section 16 is provided with nozzles 60 for spraying whey saturated with salt on the curd on the conveyor 55, and peg stirrers 31 operable to agitate the curd to distribute the whey/salt solution more uniformly throughout the curd. The slats 57 of the conveyor 55 are apertured to facilitate drainage of the whey/salt solution from the curd on the conveyor, and a plurality of trays 61 are positioned below the conveyor 55 to collect the whey/salt solution. This method of salting curd is described in more detail in our co-pending application No.

The mellowing section 17 comprises the downstream half of the conveyor 55. This section is provided with peg stirrers 40 having pegs on only half the periphery so that the stirrers can be parked in a non-operative position. The curd discharged from the conveyor 55 falls into a vibratory conveyor 62 from which curd can be drawn by vacuum into a tower (not shown) for consolidating the curd into a block of natural cheese as described in British Pat. No. 1542844.

The conveyors 21, 35, 45, 55 are each provided with a separate drive motor and gear reduction mechanism 63 adjustable to enable each conveyor to be driven at any desired speed. The conveyors are preferably of the construction described and illustrated in our co-pending patent application Ser. No. 131,929 in which each slat comprises a thin elongated metal plate having the longitudinal margins thereof bent through an angle in excess of 90° and longitudinal strengthening means in the form of a V shaped bar having the ends thereof secured to the end portions of the plate, the centre portion of the plate being supported by a strut on the centre of the bar. Conveyors having slats of this construction can provide a substantially flat upper surface but nevertheless be several meters wide and support a heavy load per unit area without the aid of additional supports between the chains.

The side skirts 28, 29 of the drainage conveyor 21 are arranged as shown in FIG. 3 to effect a lateral compression of the curd as it travels along the conveyor, and the side skirts 38, 39 of the matting conveyor 35 are arranged as shown in FIG. 4 to effect a further lateral compression of the curd in the upstream portion of the conveyor, and then to permit expansion of the curd in the downstream portion of the conveyor 35. The lateral compression of the curd, in conjunction with agitation by the peg stirrers 31 assists in releasing whey from the curd, and the subsequent expansion of the curd in the downstream portion of the conveyor 35 assists in allowing the whey to filter down to the top surface of the conveyor and drain away between the slats.

As explained previously, the curd at the downstream end of the conveyor 35 has fused into a substantially continuous mat of curd, and the conveyor 45 is driven at a slightly higher speed than conveyor 35 so as to effect longitudinal stretching of the mat of curd as it is transferred from the conveyor 35 to conveyor 45. In addition, the side skirts 48, 49 of the cheddaring conveyor 45 are arranged as shown in FIG. 5 to permit a lateral stretching of the mat of curd under its own weight. The stretching of the curd assists in the cheddaring action.

The side skirts 58, 59 of the conveyor 55 which extends through the salting and mellowing sections are parallel to one another.

As shown in FIG. 1 the whey collecting tray 25 of the drainage unit 20 and the whey collecting trays 30 of the drainage conveyor 21 are connected to a separate outlet pipe 65. The whey collecting trays 41 of the conveyor 35 are connected to a separate outlet pipe 66. The trays 51 under the upstream portion of the cheddaring conveyor 45 are connected to an outlet pipe 67 and the trays under the downstream portion of the conveyor are connected to a separate outlet pipe 68. The trays 61 under the upstream portion of the conveyor 55, that is the portion extending through the salting section, are connected to an outlet pipe 69, and the trays 61 under the downstream portion of the conveyor 55, that is the portion extending through the mellowing section, are connected to an outlet pipe 70.

Each of the outlet pipes 65–70 are fitted with sensors (not shown) adapted to measure the acidity level of the whey draining from the collecting trays associated with the outlet pipe.

The spray nozzles 32 on the conveyors 21, 35 are for use in spraying water or other liquid onto the curd to wash away lactic acid from the surfaces of the curd, and thereby arrest acid development in the curd.

In the manufacture of cheddar cheese with the apparatus shown in the drawings, the peg stirrers 40 on the conveyors 35, 45 are held in their inoperative positions to permit the curd particles to fuse together.

The peg stirrers 40 are operated when the apparatus is used for the manufacture of Colby or Montery cheese and the curd has to be maintained in a granular form. The spray nozzles 32 are used to spray water onto the curd in the manufacture of cheese from washed granular curd.

Although the apparatus shown in the drawings is particular suitable for the continuous manufacture of cheese, it may be used to process curd in batches taken sequentially from a number of vats in which the curd and whey is produced.

I claim:

1. Apparatus for the continuous manufacture of cheese from raw curd comprising structure defining a drying and de-wheying section, a fusing section, a cheddaring section, a milling section, a salting section, and a mellowing section, and including:
   (a) first conveyor means in said drying and de-wheying section,
   (b) means for feeding curd in a continuous stream onto said first conveyor means,
   (c) agitator means operable to agitate curd on said first conveyor means to facilitate drainage of whey therefrom,
   (d) second conveyor means in said fusing section, said second conveyor means being arranged to receive curd discharged from said first conveyor means and permitting fusion of the curd thereon into a mat of curd,
   (e) third conveyor means in said cheddaring section, said third conveyor means being arranged to receive the mat of curd discharging from said second conveyor means and to effect lateral expansion of the mat of curd thereon so as to stretch the curd,
   (f) a milling device in said milling section arranged to receive curd discharging from said third conveyor means and to cut the curd into separate pieces,
   (g) fourth conveyor means arranged to receive curd discharged in pieces from the milling device, said fourth conveyor means extending through the salting and mellowing sections,
   (h) means for applying salt to the curd on said fourth conveyor means during passage through said salting section, the salt being absorbed into the curd during passage through said mellowing section,
   (i) agitator means operable to agitate the curd and salt on said fourth conveyor means,
   (j) a plurality of trays arranged beneath each of said conveyor means to collect whey drained from curd on the conveyor means, said trays being so arranged to segregate whey of different acid levels drained from the different sections of the apparatus, and (k) individual drive means operable to drive each of said conveyor means at variable speeds independently of the speed of the other conveyor means, whereby acid development in the curd may be regulated by controlling the residence time of the curd in each section in accordance with the acid levels of the whey in said trays.

2. The apparatus defined in claim 1, wherein each of said conveyor means comprises an endless conveyor having a substantially flat upper surface for supporting curd thereon and side skirts for retaining curd on the conveyor, the surface of the conveyor having openings for drainage of whey into the trays beneath the conveyor.

3. The apparatus defined in claim 2, wherein the side skirts of the third conveyor means diverge from one another in the direction of travel of the third conveyor means to permit lateral expansion of the mat of curd thereon and thereby effect stretching of the curd.

4. The apparatus defined in claim 3, wherein the side skirts on the first conveyor means are arranged to compress the curd laterally during passage through the drying and de-wheying section, and the side skirts on the second conveyor means are arranged to compress the curd laterally during passage through the upstream portion of the fusing section and then to permit lateral expansion of the mat of curd during passage through the downstream portion of the fusing section.

5. The apparatus defined in claim 2, wherein each conveyor comprises two endless drive chains mounted on pulleys on said structure, and a plurality of transverse slats mounted on and extending between the chains, the side skirts being mounted on said structure and in sliding contact with the slats, and said slats being spaced close enough together substantially to prevent curd falling through therebetween while permitting drainage of whey.

6. The apparatus defined in claim 5, wherein the parts of the slats on the first conveyor means and the fourth conveyor means between the side skirts are perforated to facilitate drainage of whey into the trays underneath the respective conveyor means.

7. The apparatus defined in claim 1, wherein the discharge end of the first conveyor means overlaps the receiving end of the second conveyor means, the first and second conveyor means being driven in the same direction, the third conveyor means is positioned below the first and second conveyor means and is adapted to be driven in the opposite direction thereto, and the fourth conveyor means is positioned below the third conveyor means and is adapted to be driven in the opposite direction thereto, the whey collecting trays for the first and second conveyor means being positioned above the third conveyor means, and the whey collecting trays for the third conveyor means being positioned above the fourth conveyor means.

8. The apparatus defined in claim 1 including:
(1) agitator means operable to agitate the curd on said second and third conveyor means, and
(m) means for spraying liquid onto curd on said first and second conveyor means to wash lactic acid from the surfaces of the curd.

9. The apparatus defined in claim 8, wherein each of said agitators comprises a peg stirrer having a rotatable transverse shaft and a plurality of radially extending pegs mounted on said shaft and arranged to engage curd on the conveyor means upon rotation of the shaft.

10. The apparatus defined in claim 9, wherein the peg stirrers spaced along said second conveyor means, said third conveyor means and the downstream portion of the fourth conveyor means have the pegs thereof not extending on all sides of the shaft whereby it is possible to position the stirrers such that the pegs do not engage curd on the conveyor means.

11. The apparatus defined in claim 9, wherein at least two of said conveyor means are superimposed one above the other, and the peg stirrers of the lower of the two superimposed conveyor means are interposed between the whey collecting trays of the upper of the two conveyor means so as to minimise the overall height of the apparatus.

12. The apparatus defined in claim 1, wherein the means for feeding curd in a continuous stream onto said first conveyor means comprises a reservoir for reception of a mixture of raw curd and whey, said reservoir having a weir for overflow of curd and whey, and an inclined drainage screen arranged to receive overflow of curd and whey at said weir, the screen having openings for drainage of whey therethrough while curd moves downwardly by gravity over the screen.

13. The apparatus defined in claim 12, wherein the angle of inclination of said screen is adjustable to regulate the residence time of the curd on the screen.

14. The apparatus defined in claim 1, including:
(1) an external casing on said structure enclosing said first, second, third and fourth conveyor means and the drainage trays, to enable the curd to be maintained at a substantially constant temperature and to avoid air-borne contamination.

15. Apparatus for the continuous manufacture of cheese from raw curd, comprising a structure supporting:
(a) first endless conveyor means,
(b) means for feeding curd in a continuous steam onto said first conveyor means,
(c) second endless conveyor means arranged to receive curd discharged from said first conveyor means,
(d) third endless conveyor means arranged to receive curd from said second conveyor means,
(e) fourth endless conveyor means arranged to receive curd from said third conveyor means,
(f) a plurality of agitators arranged at spaced intervals along each of said first, second, third and fourth conveyor means and operable to agitate the curd thereon,
(g) means for spraying liquid onto curd on said first and second conveyor means to wash lactic acid from the surfaces of the curd,
(h) means for applying salt to the curd on the upstream portion of said fourth conveyor means,
(i) a plurality of trays arranged beneath each of said conveyor means to collect whey drained from curd on the conveyor means, said trays being so arranged to segregate whey of different acid levels drained from different sections of each of the conveyor means,
(j) an external casing mounted on said structure and enclosing said conveyor means and drainage trays to enable the curd to be maintained at a substantially constant temperature and to avoid air-borne contamination, and
(k) individual drive means operable to drive each of said conveyor means at variable speeds independently of the speed of the other conveyor means, whereby acid development in the curd may be regulated by controlling the residence time of the curd on each conveyor means in accordance with the acid level of the whey in each of said trays.

16. Apparatus as defined in claim 15, wherein the third endless conveyor means is positioned directly below the first and second endless conveyor means, and the fourth endless conveyor means is positioned directly below the third endless conveyor means, the whey collecting trays for the first and second conveyor means being positioned above the third conveyor means, and the whey collecting trays for the third conveyor means being positioned above the fourth conveyor means.

17. Apparatus as defined in claim 16, wherein each of said agitators comprises a peg stirrer having a rotatable transverse shaft and a plurality of radially extending pegs mounted on said shaft and arranged to engage curd on the conveyor means.

18. Apparatus as defined in claim 17, wherein the collecting trays are substantially V-shaped in cross section taken along the longitudinal axis of the associated conveyor means, the peg stirrers on the third conveyor means project into the spaces between the sides of adjacent whey collecting trays for said first and second conveyor means, and the peg stirrers on the fourth conveyor means project into the spaces between the sides of adjacent whey collecting trays for said third conveyor means.

19. Apparatus for the continuous manufacture of cheese from a mixture of raw curd and whey, comprising a structure defining a drying and de-wheying section, a fusing section, a cheddaring section, a milling section, a salting section, and a mellowing section, and including
   (a) a reservoir for reception of a mixture of raw curd and whey, said reservoir having a weir for overflow of curd and whey,
   (b) an inclined drainage screen arranged to receive overflow of curd and whey at said weir, the screen having openings for drainage of whey therethrough while curd moves downwardly by gravity over the screen,
   (c) means for adjusting the angle of inclination of said drainage screen to regulate the residence time of the curd on the screen,
   (d) a first endless slat conveyor in said drying and de-wheying section and arranged to receive drained curd from the lower end of said drainage screen,
   (e) a second endless slat conveyor in said fusing section and arranged to receive curd discharged from said first conveyor,
   (f) a third endless slat conveyor in said cheddaring section and arranged to receive curd discharged from said second conveyor,
   (g) a milling device in said milling section arranged to receive curd discharged from said third conveyor and to cut the curd into separate pieces,
   (h) a fourth endless slat conveyor arranged to receive curd discharged in pieces from the milling device, said fourth conveyor extending through the salting and mellowing sections,
   (i) means for applying salt to the curd on said fourth conveyor during passage through said salting section, the salt being absorbed into the curd during passage through said mellowing section,
   (j) side skirts mounted on said structure in sliding contact with the slats of the slat conveyors, the skirts retaining the curd on the conveyors and arranged to effect lateral compression of the curd during passage through the drying and de-wheying section and to permit lateral expansion of the curd during passage through the cheddaring section,
   (k) a plurality of peg stirrers spaced along each of said conveyors and operable to agitate the curd on the conveyors, each peg stirrer comprising a rotatable transverse shaft and a plurality of radially extending pegs mounted on said shaft and arranged to engage curd on the conveyor upon rotation of the shaft, the peg stirrers spaced along said second and third conveyors and on the downstream portion of the fourth conveyor having the pegs thereof not extending on all sides of the shaft whereby it is possible to position the stirrers such that the pegs do not engage curd on the conveyors,
   (l) means for spraying liquid onto curd on said first and second conveyors to wash lactic acid from the surface of the curd,
   (m) a plurality of trays arranged beneath each of said conveyors to collect whey drained from curd on the conveyor means, said trays being so arranged to segregate whey of different acid levels drained from the different sections of the apparatus, and
   (n) individual drive means operable to drive each conveyor and regulate the speed of the conveyor independently of the speed of the other conveyors, whereby acid development in the curd may be regulated by controlling the residence time of the curd in each section in accordance with the acid levels of the whey in said trays.

* * * * *